Figure 1:
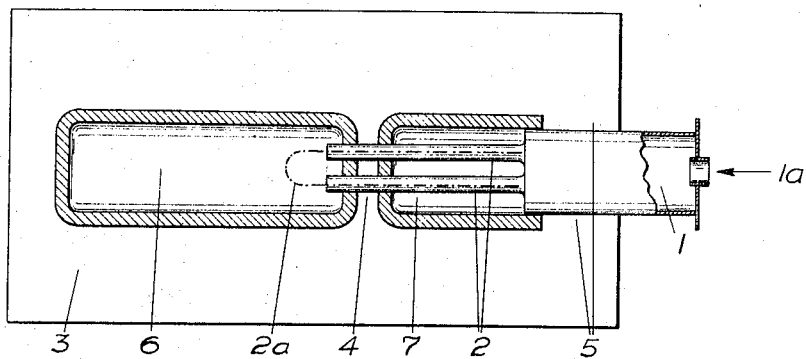

March 7, 1967     F. SCHÖLLAUF     3,308,214
METHOD OF THE SIMULTANEOUS MANUFACTURE OF TWO OR MORE
BODIES CONNECTED BY AT LEAST ONE CONNECTING ELEMENT
Filed June 13, 1963

INVENTOR
FRANZ SCHOELLAUF
BY
*Ernest G. Montague*
ATTORNEY.

United States Patent Office 3,308,214
Patented Mar. 7, 1967

3,308,214
METHOD OF THE SIMULTANEOUS MANUFACTURE OF TWO OR MORE BODIES CONNECTED BY AT LEAST ONE CONNECTING ELEMENT
Franz Schöllauf, Fernitz, near Graz, Styria, Austria, assignor, by mesne assignments, to Shell Oil Company, New York, N.Y., a corporation of Delaware
Filed June 13, 1963, Ser. No. 287,666
Claims priority, application Austria, June 14, 1962, A 4,780/62
15 Claims. (Cl. 264—94)

The present invention relates to a method of the simultaneous manufacture of two or more bodies connected by at least one connecting element.

It is already known to make hollow bodies from tubular synthetic thermoplastics by inflating heated tubular sections in hollow molds. Bottles, cans and the like, for instance, are made by this method, in which plastic tubing, preferably in thermoplastic condition, is applied around a blow core and either two hollow mold half sections are applied around the lower portion of the tubing, which lower portion surrounds the blow core, and around any tubing portion above said lower portion, and a corresponding section of tubing which corresponds to the length of the mold is severed from the remaining portion of tubing, whereafter the mold is closed and compressed air is supplied through the blow core to inflate the severed section of tubing within the hollow mold so that the walls of the tubing assume the internal shape of the two mold halves. During the blowing, the temperature of the tubing may be sufficiently high to permit of the deformation of the tubing or additional heat may be supplied by way of the blow mold.

When this method is to be used for making, for instance, two hollow bodies connected by any suitable connecting elements, it is necessary to connect these two bodies in a relatively complicated manner by the connecting element or elements after the members have been manufactured. Special difficulties arise when one of the bodies is to be firmly closed because any connecting element can be anchored only with difficulty and in a complicated manner in a body which is closed on all sides. In most of these cases, the only method which may be adopted comprises forming the closed hollow body initially with an opening and closing it subsequently, for instance, by a closing member applied by screwing or welding. It will be appreciated that such a procedure is time-consuming and expensive.

It is the object of the present invention to provide a method of manufacturing such bodies which are connected by a connecting element, in which method the above-mentioned disadvantages are avoided.

It is another object of the present invention to provide a method wherein a connecting element or inserts for establishing a rigid, flexible or rotatable connection are initially introduced into a fixture of a blow mold, which fixture may serve as a blow core at the same time, then the plastic tubing moving over the fixture or the plastic tape (or tapes) moving over the fixture, is (or are) squeezed off at the position of the inserts and at any desired position above the introduced connecting element and the inserts, and is (or are) squeezed at least at one point over and/or below the connecting element and/or the inserts, so as to leave a small air passage around or within the connecting element and is or are sealed any desired distance below the connecting element and/or or inserts in any desired manner, for instance, by being forced against a blow core or the like, whereafter air is blown into one or more portions of the resulting connected formation to give it the desired shape. Any thin web of plastic extending along the connecting element in the resulting composite body obtained by this method of manufacture can easily be removed from the outside so that at least two hollow bodies connected by one or more connecting elements are obtained in one operation, at least one of which bodies may be completely closed without requiring a time-consuming and expensive subsequent operation.

The invention enables without difficulty the manufacture of two or more connected bodies having cavities which do not communicate with each other after the manufacture of the bodies. If this is desired, hollow inserts may be used which have internal valves, which enables the blowing fluid to enter from the blow core or one body into the other, but prevent a return flow of the fluid which has been forced through. This enables the manufacture of connected bodies, one of which is, e.g., subjected to a permanent internal pressure. It is also possible in this way to manufacture containers having cavities which are separated by the valves and may contain different, mutually independent contents or be subjected to different internal pressures.

It will be understood that the process according to the present invention enables also the provision of bodies having a larger or smaller cavity and/or a thinner or thicker wall. In the extreme case, connected bodies may be made, one or more of which consist virtually of solid plastic so that there is no cavity or only a cavity of minimum size in the body.

Figure 2:
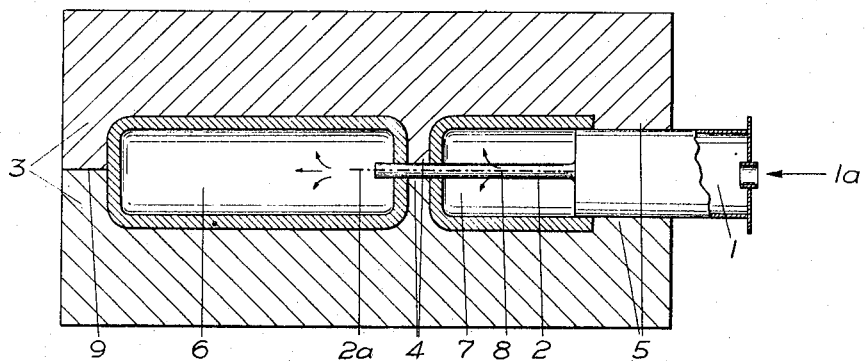
Figure 3:
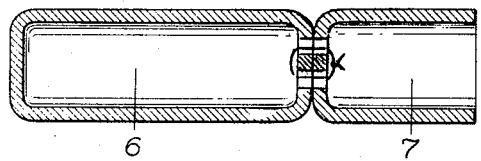

With these and other objects in view which will become apparent in the following detailed description, the present invention will be clearly understood in connection with the accompanying drawings, in which:

FIGURE 1 is a top plan view of a lower half section of an open blow mold according to the present invention and hollow bodies disposed in the lower mold half section and shown in section. This blow mold is intended for manufacturing two hollow bodies connected by two connecting elements, such as steel ropes or the like;

FIG. 2 is a sectional view taken at right angles to the plane of FIG. 1 through both half sections of the mold in closed position; and FIG. 3 is a view showing the finished product made according to the present invention and consisting of plastic bodies connected, for instance, by means of a steel rope, which constitutes the simplest connecting element. The rigid, flexible or rotatable connecting means may additionally extend through suitable inserts.

Referring now to the drawing, and in particular to FIG. 1, a hollow blow core is provided, which is shown partly in section and is provided, for instance, with two tubular extensions 2. These tubular extensions 2 communicate with the supply pipe for compressed air. Two mold half sections 3 may be closed to surround this blow core and its tubular extensions have portions 4 in close contact with the tubular extensions and portions 5 in tight contact with the blow core 1 in the closed position of the mold. Closing the mold half sections thus results in the formation of two chambers 6 and 7, which communicate through the tubular members 2. The mode of operation of the apparatus is as follows: The connecting elements, for instance, a steel rope 2a, which serve for connecting the hollow bodies to be formed, are initially introduced into the tubular extension 2 of the blow core 1. Thermoplastic tubing tape or the like is then applied around the connecting element 2a, the tubular extensions 2 and the blow core 1, which thermoplastic tubing tape is made of a tubular blank formed from at least one plastic tape, and the two mold half sections 3 are subsequently closed so that the thermoplastic material is squeezed off at points 9, 4 and, if desired, at point 5 of the mold and two mutually independent hollow bodies are formed in the chambers 6 and 7, but communicate through the tubular extension. When the material is still in a plastic condition, air can now be blown in through the blow core 1 and the tubular portions 2 and can enter into the chamber 7, for instance, through openings 8 formed in the tubular extensions 2 or through openings formed directly in the blow core 1 and can enter the chamber 6 through the end of the tubular extensions 2. This air will serve to force the thermoplastic material against the walls of the mold half sections when this is desired. When the mold has been opened, the two resulting hollow bodies may be withdrawn from the core 1 and the tubular extensions 2 and are connected by the connecting element consisting, e.g., of a U-shaped steel rope and inserted into the tubular extensions 2 at the beginning of the cycle of operation. The hollow body formed in the chamber 6 is entirely closed.

The method described hereinbefore is of special significance for the manufacture of directing means for streets, roads or the like.

While I have disclosed several embodiments of the present invention, it is to be understood that these embodiments are given by example only and not in a limiting sense, the scope of the present invention being determined by the objects and the claims.

I claim:

1. A method of manufacturing at least two bodies connected by at least one connecting element, said method comprising holding at least one connecting element in a predetermined position, forming plastics material adapted to assume a plastic state at an elevated temperature into a tubular blank which surrounds said connecting element and has an end portion protruding beyond said connecting element, squeezing said blank at said protruding end portion to close said end portion, squeezing said blank around said connecting element to sever said blank into two sections connected by said connecting element, sealing said blank opposite to said protruding end portion and inflating at least one of said sections in at least one closed, bipartite blow mold while maintaining said blank in a plastic state.

2. A method as set forth in claim 1, in which said blank is squeezed around said connecting element at at least two spaced apart points to sever said blank into more than two sections connected by said connecting element.

3. A method as set forth in claim 1, in which said plastics material is formed into a tubular blank which surrounds at least two connecting elements and said blank is squeezed around each of said connecting elements to sever said blank into more than two blank sections connected by said connecting elements.

4. A method as set forth in claim 1, in which said blank is formed from plastic tubing.

5. A method as set forth in claim 1, in which said tubular blank is formed from at least one plastic tape.

6. A method as set forth in claim 1, in which said connecting element is inserted into a blow core before said blank is formed around said connecting element.

7. A method as set forth in claim 1, in which said connecting element is adapted to rigidly connect said sections after at least one of them has been inflated.

8. A method as set forth in claim 1, in which said connecting element is adapted to flexibly connect said sections after at least one of them has been inflated.

9. A method as set forth in claim 1, in which said connecting element is adapted to rotatably connect said sections after at least one of them has been inflated.

10. A method as set forth in claim 1, in which said blank is sealed opposite to said end portion by forcing said blank opposite to said end portion against a blow core and in which said one section is inflated by air supplied through said blow core.

11. A method as set forth in claim 1, in which said blank is squeezed around said connecting element to leave a small air passage defined by the connecting element and air is supplied into one of said sections and through said air passage into the other of said sections to inflate both said sections in said mold.

12. A method as set forth in claim 11, in which said connecting element is tubular to define said passage inside said connecting element.

13. A method as set forth in claim 12, in which said connecting element incorporates a check valve permitting of a flow of air through said air passage only in the direction from said one section into the other section.

14. A method as set forth in claim 11, in which said connecting element is surrounded with a tubular element and said blank is formed around said connecting element and said tubular element and is squeezed around said tubular element to leave said air passage around said connecting element.

15. A method as set forth in claim 1, in which said connecting element is inserted into a blow core to hold said connecting element in said predetermined position and said one section is inflated by supplying air through said blow core into said mold.

References Cited by the Examiner

UNITED STATES PATENTS

| | | | |
|---|---|---|---|
| 2,541,249 | 2/1951 | Hobson | 264—98 XR |
| 3,015,856 | 1/1962 | Cohn | 264—94 |
| 3,089,186 | 5/1963 | Park | 18—5 |
| 3,140,329 | 7/1964 | Nutting | 264—94 XR |
| 3,159,697 | 12/1964 | Tocci | 264—94 |
| 3,209,400 | 10/1965 | Di Settembrini | 18—5 |

ROBERT F. WHITE, *Primary Examiner.*

A. R. NOE, *Assistant Examiner.*